United States Patent [19]
Smyl

[11] Patent Number: 6,120,078
[45] Date of Patent: Sep. 19, 2000

[54] PROTECTIVE LINER INSERT FOR VEHICLE CARGO COMPARTMENT

[75] Inventor: Stanislaw Smyl, 202-130 West 5th Street, North Vancouver, B.C. V7M 1J8, Canada

[73] Assignee: Stanislaw Smyl, North Vancouver, Canada

[21] Appl. No.: 08/984,317

[22] Filed: Dec. 3, 1997

[51] Int. Cl.[7] .................................................. B60R 13/01
[52] U.S. Cl. ........................................ 296/39.1; 296/39.2
[58] Field of Search ................... 296/39.2, 39.1; 224/401, 402, 403

[56] References Cited

U.S. PATENT DOCUMENTS

| | | | |
|---|---|---|---|
| 1,233,661 | 7/1917 | Gordon . | |
| 2,867,471 | 1/1959 | Coon, Jr. | 296/23 |
| 2,898,146 | 8/1959 | Yudenfreund | 296/39.1 |
| 4,089,554 | 5/1978 | Myers | 296/24 |
| 4,779,752 | 10/1988 | Vallee et al. | 220/22.1 |
| 4,938,519 | 7/1990 | Schlachter | 296/37.6 |
| 4,944,612 | 7/1990 | Abstetar et al. | 296/39.2 |
| 4,991,899 | 2/1991 | Scott | 296/39.2 |
| 5,052,580 | 10/1991 | Khoury | 220/505 |
| 5,154,478 | 10/1992 | Erickson et al. | 296/36.2 |
| 5,161,700 | 11/1992 | Stannis et al. | 211/175 |
| 5,215,205 | 6/1993 | Behlman | 220/4.31 |
| 5,240,301 | 8/1993 | Arnold | 296/39.2 |
| 5,269,447 | 12/1993 | Gower et al. | 224/42.42 |
| 5,381,940 | 1/1995 | Wright | 224/42.42 |
| 5,441,183 | 8/1995 | Frenzel | 224/542 |
| 5,806,909 | 9/1998 | Wise | 296/39.1 |
| 5,829,655 | 11/1998 | Salopek | 224/402 |

*Primary Examiner*—D. Glenn Dayoan
*Assistant Examiner*—Lori L. Coletta
*Attorney, Agent, or Firm*—Michael A. Glenn

[57] ABSTRACT

The invention comprises a van, truck, car or similar vehicle cargo compartment protective liner insert assembly. The insert comprises sections held tightly together by latch means to form a durable protective barrier lining the cargo area to reduce damage by cargo. The front section houses an easily accessible frontward-facing storage compartment. The liner is convertible to a free standing wheeled storage shelf when not in use in the vehicle.

12 Claims, 3 Drawing Sheets

PROTECTIVE LINER INSERT FOR VEHICLE CARGO COMPARTMENT

TECHNICAL FIELD OF THE INVENTION

This invention relates to a protective liner insert comprising storage compartments for the cargo area of vans, trucks, cars and similar vehicles.

BACKGROUND OF THE INVENTION

It is known to provide an insertable cargo compartment for motor vehicles. Examples of such a device are disclosed in U.S. Pat. No. 1,233,661 to Gordon, and U.S. Pat. No. 5,161,700 to Stannis. The Gordon patent teaches the concept of a removable cargo compartment insert for a vehicle. The Stannis patent comprises an insert with opposed lateral side walls and transverse base wall corresponding to the sides and base of a vehicle cargo compartment.

It is also known to provide a vehicle insert comprising separable sections and latch joining mechanisms. An example of this is disclosed in U.S. Pat. No. 2,867,471 to Coon. In the Coon patent, the latch mechanisms are used to connect removable drawers which fit inside a non-latched main frame unit.

There are a number of desirable objectives in relation to cargo compartment liner inserts for vans, trucks, cars, and similar vehicles. The insert should be designed to be easily insertable and removable within the limited access space found in vans, station wagons and sport utility vehicles. It should provide for the compartmentalization of cargo, including storage that is easily accessible from the seating area of the vehicle. The insert should also serve a protective function by lining the interior surface of the vehicle cargo compartment, allowing transport of cargo which could otherwise damage the interior of the vehicle, reducing its value. Finally, the insert should maximize the area available for cargo loading.

Various prior art approaches achieve some of these objectives, but with varying degrees of success. For example, in the case of the Stannis Patent and U.S. Pat. No. 5,269,447 to Gower, the compartmentalized insert does not provide a protective liner for the vehicle's interior. U.S. Pat. No. 5,441,183 to Frenzel comprises a unitary insert which is less easily insertable into the limited cargo area of vans, trucks, cars, and similar vehicles than is the current invention. The Frenzel patent also significantly decreases the available area for large objects by creating a smaller fixed compartment within the main cargo compartment.

It is an object of this invention to provide a stable and durable protective barrier for the interior of a van when the van is used to carry loads which might otherwise cause permanent damage. The invention overcomes the deficiencies of the prior art in providing a protective lining to a vehicle cargo compartment, while maximizing the available cargo area and ensuring ease of insertion and removal.

It is a further object of the invention to provide such a liner which can also be easily converted into a storage shelf when not being used in the vehicle.

In a further aspect of the invention, the front section comprises first and second opposed spaced surfaces, said first surface forming an interior wall of said insert assembly, and the space between said first and second surfaces defines a storage compartment.

SUMMARY OF THE INVENTION

According to the invention, there is provided a removable cargo compartment protective liner insert assembly for a van, truck, car or similar vehicle. The insert comprises sections removably and tightly connected by latch means for ease of insertion and removal. Side sections comprise inwardly projecting hollow wheel well enclosures. A front section comprises a front-facing storage compartment easily accessible from the seating area of some vehicles. When not in use in the vehicle as a liner insert, the assembly is easily converted to a free standing wheeled storage shelf with removable shelves.

According to one of its aspects, the invention comprises a removable cargo compartment protective insert assembly for a van, truck, car or similar vehicle. The assembly comprises two opposed side sections, each comprising a generally rectangular side panel having a bottom edge and a generally rectangular base panel extending perpendicularly from said bottom edge. Cooperating latch means are provided on each base panel for releasably connecting the distal ends of each base panel to one another to form a substantially U shaped structure. A generally elongated front section includes means for removably connecting the front section to one side of said structure.

In another aspect of the invention, a separate interposing panel is removably inserted between the edges of the base panels. Cooperating latch means are provided on the base panels of each side sections and on the interposing panel for releasably connecting the distal ends of each base panel to opposing edges of said interposing panel whereby to form a substantially U shaped structure having a forward and a rearward sides.

In a further aspect of the invention, the side panels include a hollow inwardly projecting wheel well enclosure.

In yet a further aspect of the invention, the assembly is convertible to a wheeled storage shelf and the wheel well enclosures include struts mounted on said enclosure and extending at right angles to the base panels.

In yet another aspect of the invention, the assembly further comprises a generally rectangular bottom panel selectively connectable to a side of said structure opposite said front section and wherein said bottom panel comprises caster means.

BRIEF DESCRIPTION OF THE DRAWINGS

Other aspects of the invention will be evident from the following disclosure and description of the preferred embodiment and from the drawings in which.

DETAILED DESCRIPTION OF BEST MODE AND PREFERRED EMBODIMENT OF THE INVENTION

Figure 1:
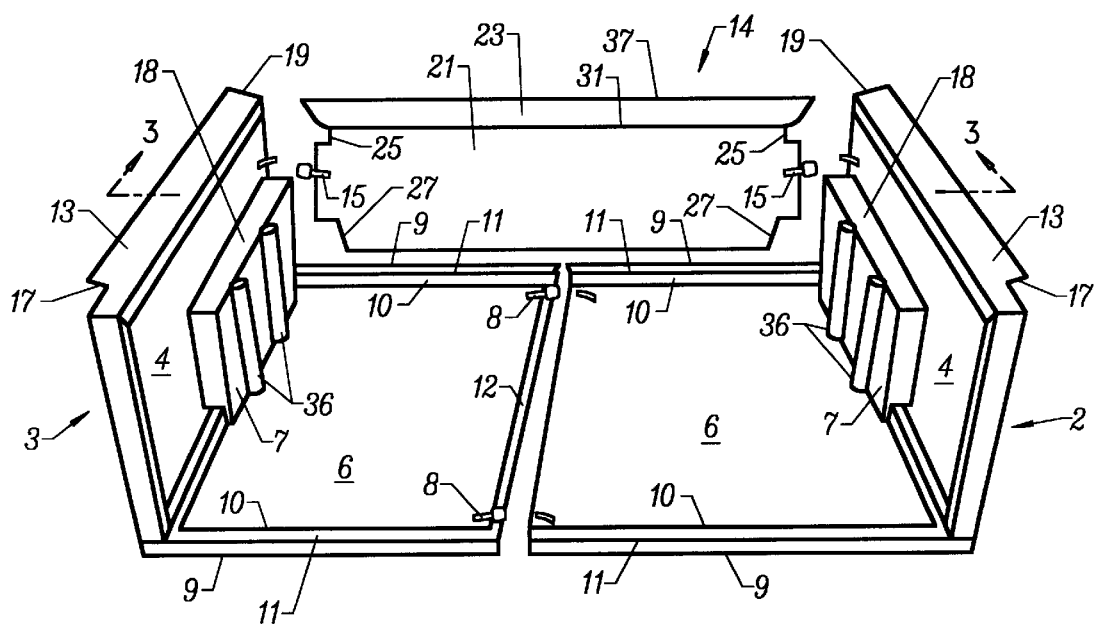
FIG. 1 is a perspective exploded view of the three sections of the assembly according to the invention.
Figure 2:
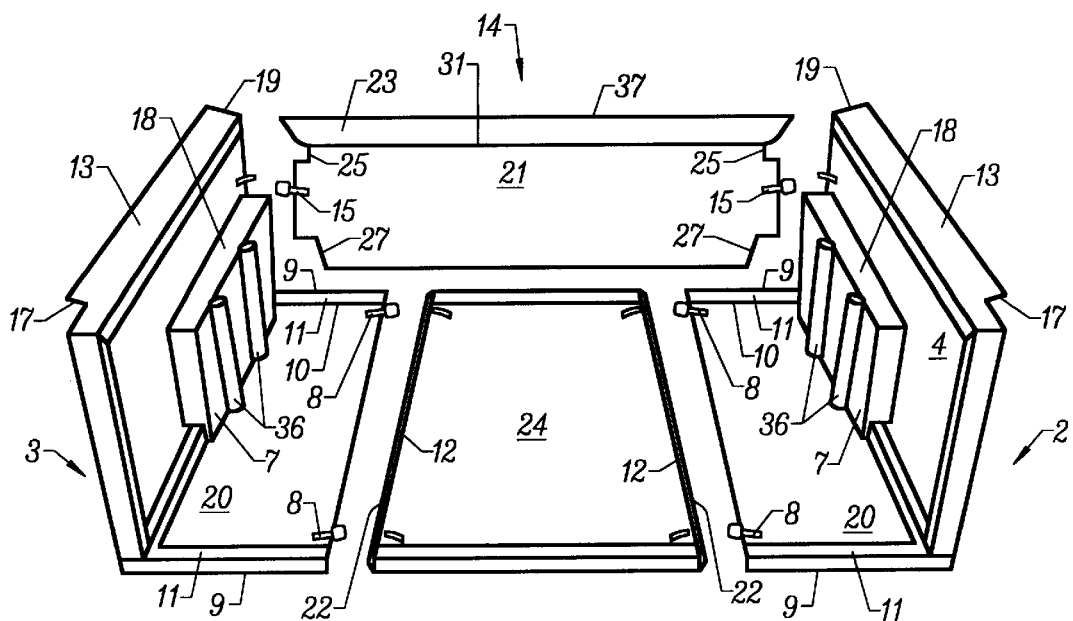
FIG. 2 is a perspective exploded view of the four sections of an alternative assembly according to the invention.

Referring first to FIGS. 1 and 2, the insert assembly according to the invention comprises first 2 and second 3 laterally opposed L-shaped side sections each comprising a flat generally rectangular side panel 4 having a bottom edge perpendicularly connected to a flat generally rectangular base panel 6. A rectangular section 7 of each side panel 4 projects inwardly to form a hollow wheel well enclosure 18 to enclose the vehicle wheel well 26. Two parallel shelf struts 36, whose function will be described below, are mounted on enclosure 18 and extend at right angles along each enclosure 18 from the base panel 6 to the upper edge of each enclosure 18.

Side sections 2, 3 further comprise a planar elongated lip 13 attached in an inverted L-shaped configuration to the upper edge of side sections 2,3. A rectangular space 17 is cut into the outside rearward corner of lip 13 and the forward end 19 of lip 13 is cut diagonally to closely engage with front section 14, described in detail below. Inside edge of lip 13 is flush with the inner compartment defined by the vehicle insert. The lip 13 serves to further protect the interior of the vehicle from damage by cargo.

Referring to FIG. 1, first side section 2 is removably connected to second side section 3 at the ends of each base panel 6 distal to side panels 4 by first cooperating latch means 8 at each end 9 of base panels 6. First latch means 8 are fixed to the interior surface 10 of a trim 11 near the distal ends of base panels 6 and are intended to provide a secure means of releasable connection which is easily attached and detached, and which does not protrude externally. The latched side sections of the assembly form a substantially U shaped structure having a forward and a rearward sides which acts as a durable protective barrier to the vehicle cargo area.

Figure 3:
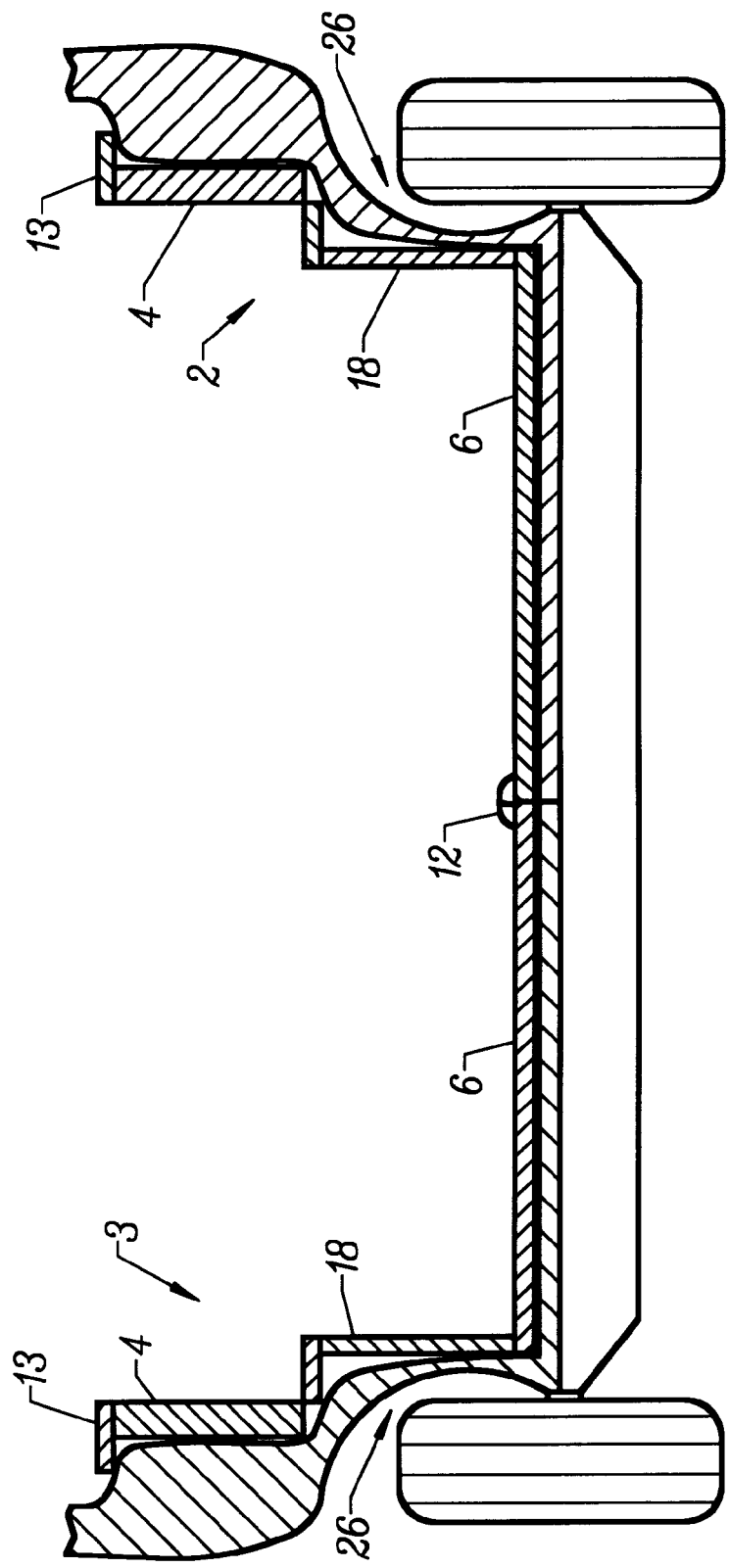
FIG. 3 is a transverse cross-sectional view of the insert of the invention taken along line 3—3 of FIG. 1.

Referring to FIGS. 1 and 3, the joint between the side sections is sealed by a flange 12. Flange 12 is fixed to base panel of second side section 3 and overlays connecting base panel of first side section 2 to form a durable seal upon application of first latch means 8. For ease of assembly, first side section 2 is inserted into the vehicle before second side section 3 to ensure proper orientation of the flange above first side section.

In the vehicle insert embodiment, a front section 14 is removably connected between adjacent ends of side panels 4 by second cooperating latch means 15. Front section 14 comprises first 21 and second 23 members joined longitudinally in an inverted L-shaped configuration. First member 21 is planar, elongated and substantially rectangular. A right-angled space 25 is cut into each upper corner of first member 21, and an obtuse-angled space 27 is cut into each lower corner of first member 21 to enable close interaction between front section 14 and side panels 4. Second member 23 is planar and elongated. Each end of second member 23 is cut diagonally to form a shorter rearward edge 31 and a longer forward edge 37 allowing close interaction with the angled upper lip 13 of side sections 2, 3. Rearward edge 31 is flush with the inner compartment defined by the vehicle insert.

In an alternative embodiment of the invention as shown in FIG. 2, first side section 2 and second side section 3 have a narrow base panel segment 20 and are removably connected by first latch means 8 to opposing edges 22 of a common interposing generally rectangular base panel 24. Latch means 8 of side sections 2, 3 are located near distal ends of base panel segments 20 and latch means 8 of interposing base panel 24 are located near opposing edges 22 of said interposing base panel 24. The joint between each side section and the common base panel 24, is sealed by a flange 12 provided along opposing edges 22 of common base panel 24. For each joint, said flange 12 is fixed to common base panel and overlays the adjoining base panel segment 20 to form a durable seal upon application of first latch means 8. When latched, side sections 2,3 and interposing base panel 24 form a substantially U shaped structure having a forward and a rearward sides which acts as a durable protective barrier to the vehicle cargo area.

Figure 4:
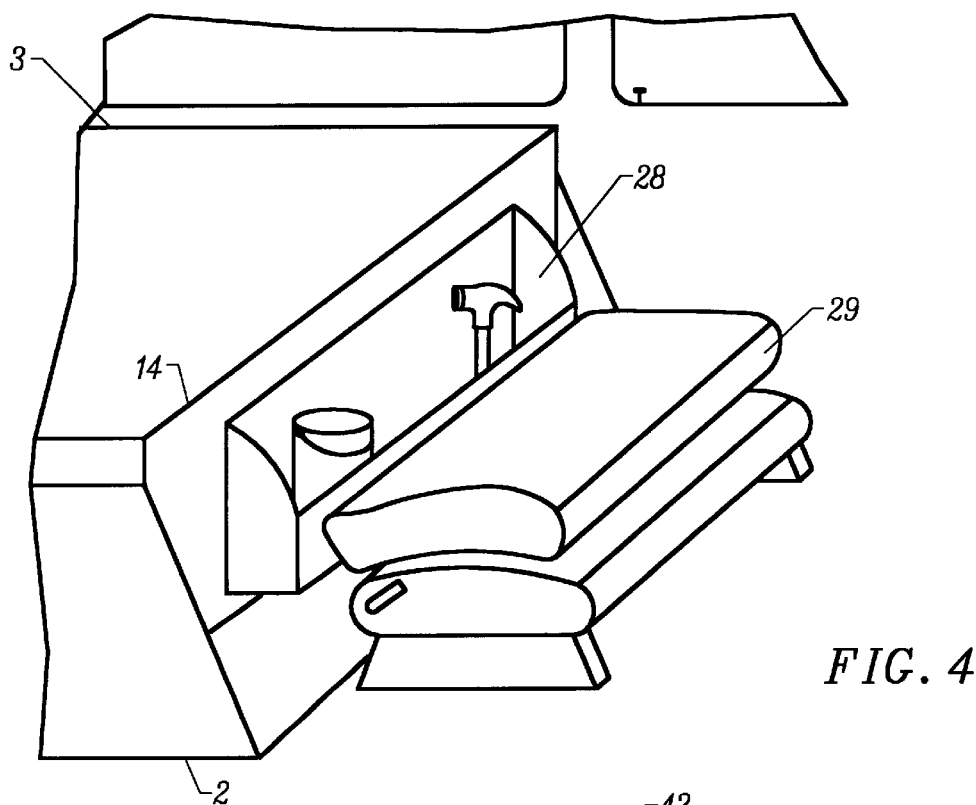
FIG. 4 is a perspective front view of the assembly of the invention showing the assembled insert in place behind the center bench seat of a van.

Referring to FIG. 4, the front section 14 includes first 40 and second 42 opposed spaced surfaces. First surface 40 forms an interior wall of said insert assembly, and the space between first surface 40 and second surface 42 defines a frontward-facing storage compartment 28 which is easily accessible from the centre bench seat 29 of a van, station wagon or similar vehicle. In one embodiment of the assembly of the invention, side sections 2, 3 are of a length to fit behind the centre bench seat 29 of the vehicle. In another embodiment, side sections 2, 3 are longer to fit the entire area behind the front seat(s) (not shown) when the centre bench seat 29 is removed, or to fit in the box of a pickup truck.

Figure 5:
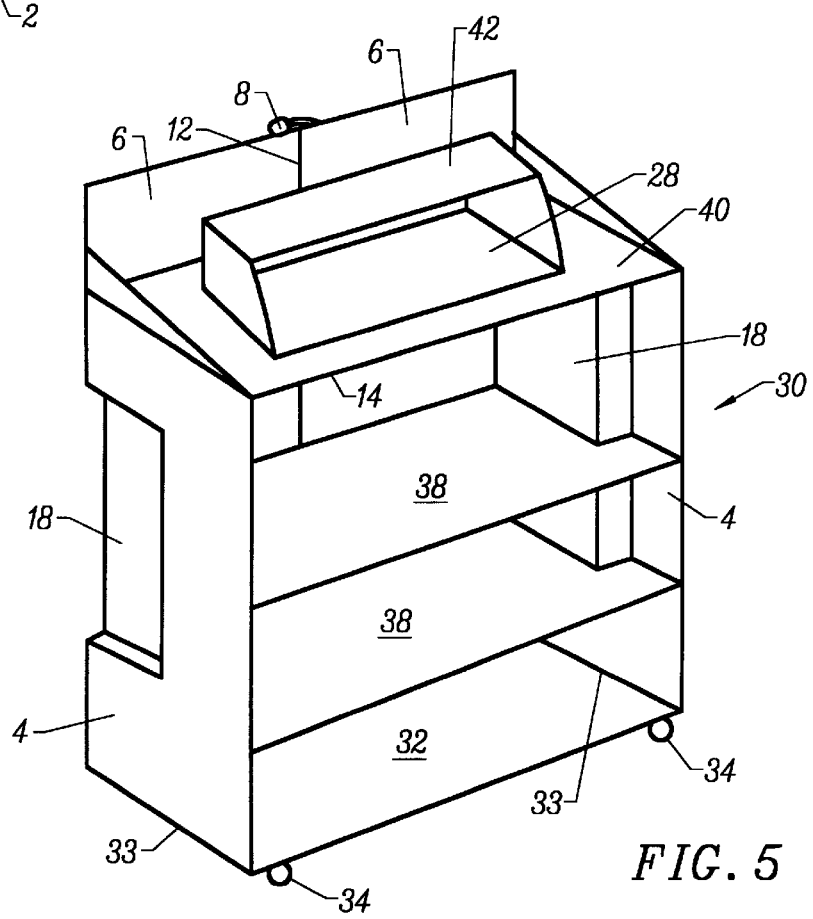
FIG. 5 is a perspective front view of the assembly of the invention in its converted form as a storage shelf.

Referring to FIGS. 1, 2, and 5, in the preferred embodiment of the invention, the liner insert can be selectively removed from the vehicle and easily converted into a free standing storage or work shelf 30 by disassembling the insert, removing the sections from the vehicle and reassembling them as follows. The insert is reassembled with the front section 14 uppermost. A flat generally rectangular bottom panel 32 is selectively connected to adjacent ends 33 of said side and base panels, opposite the front section 14. The bottom panel is equipped with a caster 34 on each corner of its lower surface for ease of mobility of the shelf 30. Flat removable rectangular shelves 38, can be positioned on shelf struts 36 to extend between the side panels 4. Shelves 38 and bottom panel 32 are easily stowed in the assembly in its vehicle insert embodiment. Bottom panel 32 also functions as a dolly for transporting heavy loads when not in use in the shelf embodiment.

It will be appreciated by those skilled in the art that other variations of the preferred embodiment may also be practised without departing from the scope of the invention.

What is claimed is:

1. A removable cargo compartment insert assembly for vehicles comprising:

two opposed side sections, each comprising a generally rectangular side panel having a bottom edge and a generally rectangular base panel extending perpendicularly from said bottom edge, said base panel having an end distal from said bottom edge;

cooperating discrete latch means on the base panels of each of said side sections for releasably connecting the distal ends of said base panels to one another whereby to form a substantially U shaped structure having a forward and a rearward sides;

a generally elongated front section including discrete latch means for removably connecting said front section to the edges of one side of said structure.

2. A removable cargo compartment insert assembly for vehicles comprising:

two opposed side sections, each comprising a generally rectangular side panel having a bottom edge and a generally rectangular base panel extending perpendicularly from said bottom edge, said base panel having an end distal from said bottom edge;

a generally rectangular interposing base panel;

cooperating discrete latch means on the base panels of each of said side sections and on said interposing panel for releasably connecting the distal ends of each of said base panels to opposing edges of said interposing panel whereby to form a substantially U shaped structure having a forward and a rearward sides;

a generally elongated front section including means for removably connecting said front section to the edges of one side of said structure.

3. An assembly as in claim 1 wherein said latch means are located near said distal ends.

4. An assembly as in claim 2 wherein said latch means of said base panels are located near said distal ends and said latch means of said interposing panel are located near said opposing edges of said interposing panel.

5. An assembly as in claims 1 or 2 wherein said front section comprises first and second opposed spaced surfaces, said first surface forming an interior wall of said insert assembly, and the space between said first and second surfaces defining a forward-facing storage compartment.

6. An assembly as in claims 1 or 2 wherein each of said side panels further comprises an inwardly projecting hollow wheel well enclosure.

7. An assembly as in claims 1 or 2 wherein said insert assembly is selectively convertible to a storage compartment.

8. An assembly as in claim 7 wherein said side panels include an inwardly projecting hollow wheel well enclosure.

9. An assembly as in claim 8 further comprising shelf struts mounted on each of said enclosures and extending at right angles to said base panels.

10. An assembly as in claim 9 further comprising a generally rectangular bottom panel selectively connectable to a side of said structure opposite said front section and wherein said bottom panel comprises caster means.

11. A removable cargo compartment insert assembly for vehicles comprising:

two opposed side sections, each comprising side and base panels perpendicularly connected in an L-shaped configuration, the base panels of said side sections removably connected to each other by latch means attached to each end of said side sections, wherein each of said side panels comprises affixed shelf struts and an inwardly projecting hollow wheel well enclosure;

a front section removably connected to said side sections by latch means, wherein said front section comprises first and second opposed surfaces, said first surface forming an interior wall of said insert assembly, and the space between said first and second surfaces defining a storage compartment.

12. An assembly as in claim 11 further comprising a bottom panel selectively connectable to said side and base panels, wherein said bottom panel comprises caster means attached to its lower surface, and wherein said assembly is selectively convertible to a mobile shelf.

* * * * *